W. V. CALLENDER.
METHOD AND APPARATUS FOR RETINNING ICE CREAM CANS.
APPLICATION FILED SEPT. 6, 1919.

1,336,886.

Patented Apr. 13, 1920.
2 SHEETS—SHEET 1.

Inventor:
Wallace V. Callender,
by W. J. Duvall,
Attorney.

W. V. CALLENDER.
METHOD AND APPARATUS FOR RETINNING ICE CREAM CANS.
APPLICATION FILED SEPT. 6, 1919.

1,336,886.

Patented Apr. 13, 1920.
2 SHEETS—SHEET 2.

Inventor:
Wallace V. Callender,
by W. S. Duvall,
Attorney.

UNITED STATES PATENT OFFICE.

WALLACE V. CALLENDER, OF CHICAGO, ILLINOIS.

METHOD AND APPARATUS FOR RETINNING ICE-CREAM CANS.

1,336,886.  Specification of Letters Patent.  Patented Apr. 13, 1920.

Application filed September 6, 1919. Serial No. 322,075.

*To all whom it may concern:*

Be it known that I, WALLACE V. CALLENDER, a citizen of the United States, residing at Chicago, in the county of Cook and State of Illinois, have invented a new and useful Method and Apparatus for Retinning Ice-Cream Cans, of which the following is a specification.

My invention relates to a method and apparatus for retinning ice-cream cans employed in the manufacture of ice-cream after such cans have become rusted and unfit for further use.

The larger ice-cream manufacturers have found retinning ice cream cans to be a comparatively easy matter, being well able to maintain a plant and stand the outlay necessary for the same and the quantities of tin used in connection with the operations of retinning; but the smaller manufacturers of ice-cream, by reason of the investment necessary, have been compelled to have all retinning done by others, thus materially adding to the cost of production of the ice-cream.

Therefore, the principal objects of my invention are, first, to provide a novel method of retinning cans, especially ice-cream cans, whereby the coating of tin is simultaneously applied evenly and thoroughly both to the interior and exterior of the surfaces of the can as well as the bottom, so as to avoid all rough places capable of affording lodgment of particles of cream, later to become sour, or other matter detrimental to the manufacture of the cream; and, second, to provide an apparatus of a simple and economical construction designed to practice my method with a minimum outlay either for the apparatus or the amount of tin necessary to be used therein, such method and apparatus for these reasons being particularly adapted for use by the smaller ice-cream manufacturers heretofore referred to.

Referring to the drawings, in which I have illustrated a simple form of apparatus capable of practising a step of my method:

Similar numerals of reference indicate similar parts in all the figures of the drawings.

Figure 1:
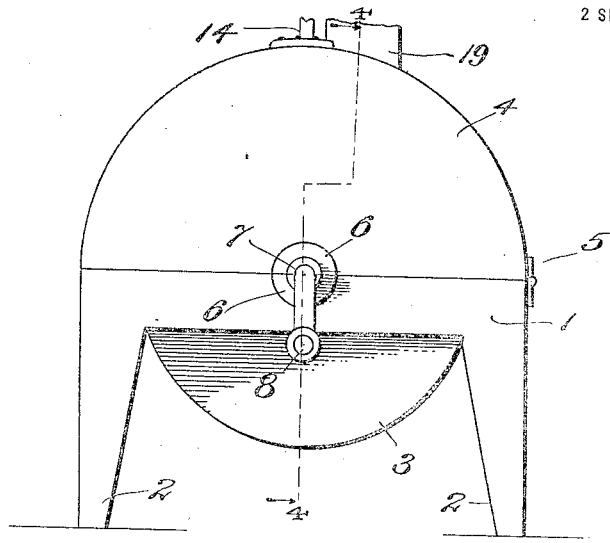
Figure 1 is an end elevation thereof, the apparatus being in position for use.
Figure 2:
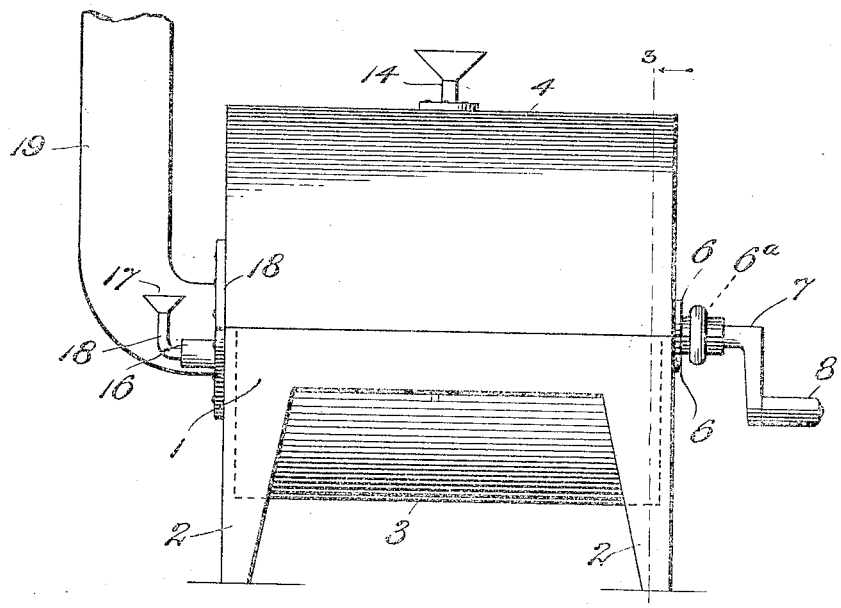
Fig. 2 is a side elevation of the same.
Figure 3:
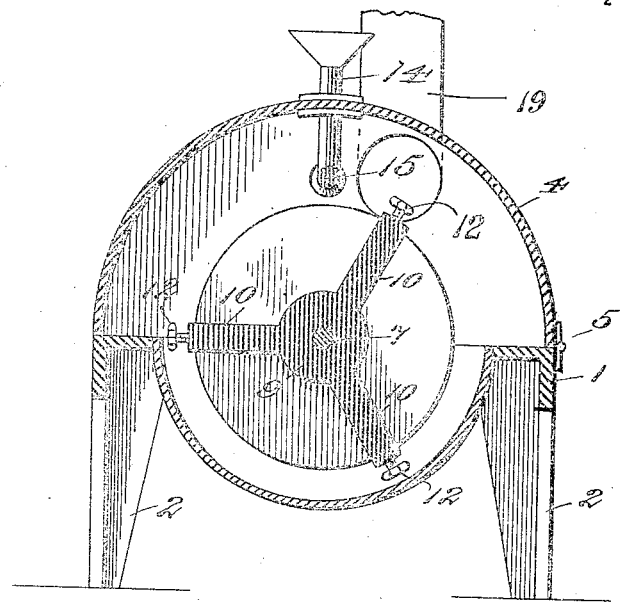
Fig. 3 is a vertical sectional view taken on the line 3—3 of Fig. 2.
Figure 4:
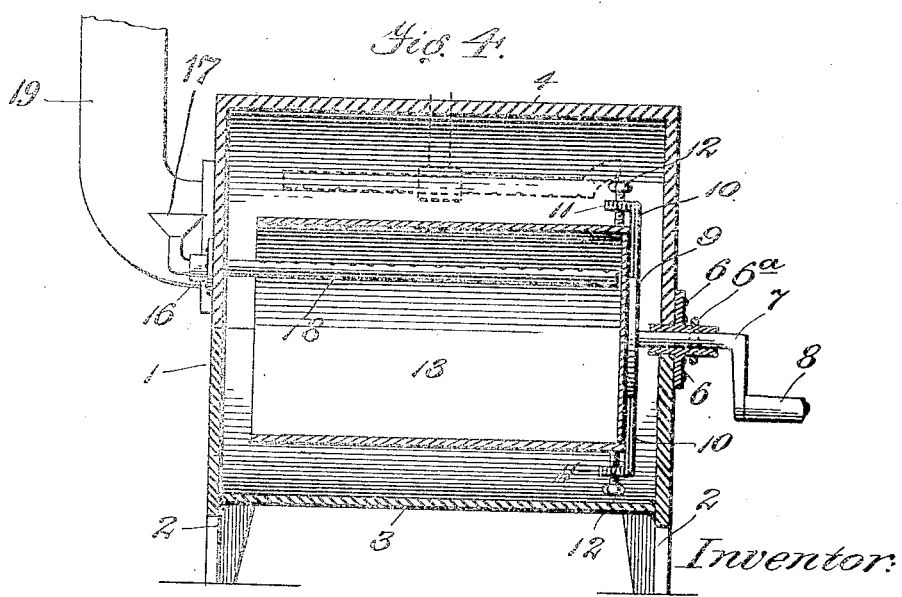
Fig. 4 is a vertical sectional view taken on the line 4—4 of Fig. 1.

It will be understood that the practice of the hereinafter described method of retinning old or used cans is not dependent upon the particular apparatus herein shown and described, but that I have shown but one form or construction of apparatus capable of use in connection with a certain step of my method and that such apparatus may be varied at will. The apparatus illustrated, however, will be found capable of successfully performing the step of retinning with but a comparatively small quantity of tin, and by reason of this fact the said construction will be found to be economical and very desirable, especially to the smaller manufacturer unable to invest and maintain the present necessary amount of capital for this purpose.

In the apparatus illustrated, it will be seen that I employ a rectangular frame 1, supporting the same upon legs or standards 2, said frame having applied thereto a suitable closure or cover 4, which is removable and therefore may be hinged to the frame, as at 5.

Depending within the frame 1, is a semi-cylindrical or trough-like bottom 3, the same preferably being but slightly greater in diameter than the can to be retinned. Below this bottom 3 may be arranged any suitable heating means (not shown) for melting the tin to be contained in said bottom.

A divided or sectional bearing-hub or sleeve 6, has one of its section bolted to the end of the cover and its remaining section bolted to the face of the frame 1, and within the hub or sleeve is removably mounted and adapted to rotate a short shaft 7, the outer end of which is cranked, as at 8, the inner end of the shaft being provided with a disk or head 9, from which radiate clamping-arms 10. The ends of these arms may be angularly disposed, as at 11, and provided with threaded openings in which are mounted clamping-bolts 12, for the purpose of retaining the can 13 in position to be rotated or spun within the bath of tin contained in the trough-like bottom or container of the apparatus.

For the purpose of carrying off the fumes and vapors emanating from the process when practised, I also prefer to provide the apparatus, at that end of the same, opposite which is located the shaft 7, with a flue or uptake 19, preferably attaching the same to the lower half or section of a divisional flange or collar 18, one half of which is secured to the hood or cover 4 and the remaining half to the frame 1 of the apparatus.

Any means may be employed for locking the hood or cover closed, but in the present instance, I have shown a clamping-ring 6ª, slipped over the two divisions of the hub or sleeve 6.

For the purpose of delivering a continuous flow of flux solution to the can during the process of tinning, I may and preferably do provide the hood or cover with a feed-pipe 14, the same depending through the cover and connecting to a perforated distributing-pipe 15, located a short distance above and disposed parallel to the can when the latter is in position. One of the ends of the pipe 14 may be extended as shown, or otherwise, for the purpose of delivering the flux solution to the end of the can. For the purpose of delivering the flux to the interior of the can, I prefer to employ a slidable perforated pipe 19, mounting the same in a flanged sleeve 16, secured to the outer face of one of the ends of the cover or hood.

The can being in position (approximately horizontal), as shown, and a suitable quantity of the tinning bath being contained within the trough-like container 3—the container being about full—the cover is closed and locked in position and the crank-handle rotated, whereby approximately one-half of the can is immersed in the bath while the other half is receiving a bath of the flux solution both interiorly as well as exteriorly, so that a heavy lasting coating of tin results. In order to assist in a smooth application of the coating, which is greatly facilitated by the axial spinning of the can within the bath of tin, a small portion of palm oil or palm oil and ordinary lubricating oil, mixed in equal parts, may be introduced into the container. After the shaft and the can affixed thereto has been removed, the oil and the foreign matter that is attracted by and adheres thereto may be removed by the use of an ordinary skimmer.

By spinning the can axially during the process of tinning, I have found that a very smooth coat of tin is collected upon the metal, one free from lumps and anything to which dirt or old cream can adhere, so that the can may be easily cleansed without danger of leaving adhering matter to sour and injure future contents of the can.

Heretofore, in retinning cans, it has been customary to employ from eight to nine hundred pounds of tin, and, at times, even more, the cans being dipped in the tin bath and withdrawn. Not only did this necessitate a very great outlay for tin, but the application of the tin was more or less uneven, the latter affording means for ready lodgment of cream etc., that would later sour and injure the future contents of the can. By my apparatus and method, a comparatively small quantity of tin is sufficient to carry on the retinning operation, and, moreover, the axial spinning of the can during its immersion in the tin tends to throw the same and spread it evenly over the surface of the metal, so that a greatly improved result is obtained. Moreover, by constantly applying the flux solution and resubmitting the can to the bath of tin, a sufficient quantity of the tin is collected to form a good heavy coat, one that will withstand hard and continuous use without deterioration.

Of course, it will be understood that, previous to the introduction of the can to be retinned to the apparatus, it is subjected to the usual cleaning operation, any of such now in use being sufficient for the purpose. In order to rid the can from all rust and other adhering foreign matter and expose the iron in a clean condition ready for the flux solution, I immerse the can in a pickle composed of muriatic-acid, leaving the can in pickle a period of time commensurate with its condition. After pickling the can is immersed in a bath of flux of cut-acid—muriatic-acid and zinc. The can is now ready for introduction in the apparatus.

Considerable fumes, popping, and "frying" will result from the introduction of the flux solution into the bath of tin, and it is to take care of and carry such off, that I employ the flue or uptake 19, the heat in the apparatus being sufficient to cause said fumes to rise and pass out at the upper end of the uptake without the necessity of employing an exhaust-fan for the purpose.

Twenty or thirty pounds of tin I have found ample to employ in connection with my method and apparatus, so that, as will be apparent, there is such a saving in the outlay for tin alone over the eight or nine hundred pounds generally employed, that the apparatus and method is well within the reach of the smaller ice-cream manufacturer for the purpose of retinning his used cans.

Any heating means (not shown) may be employed for melting the tin to the desired degree.

Having described my invention, what I claim, is:

1. A step in the method of retinning cans, which consists in spinning the same axially and while supported approximately in a horizontal position in a bath of tin.

2. A step in the method of retinning cans, which consists in spinning the can axially in a bath of tin.

3. A step in the method of retinning cans, which consists in spinning the can axially and only partially submerged in a bath of tin.

4. A step in the method of retinning cans, which consists in spinning the can axially and while only partially submerged in a bath of tin and in spraying the exposed portions of the can with a fluxing solution.

5. The method of retinning cans, consisting of cleaning the same, immersing them in a bath of flux, and finally in successively partially submerging them in a bath of tin and spinning them axially while supported in an approximately horizontal position.

6. The method of retinning cans, consisting of pickling the can in a bath of muriatic-acid, immersing in a flux bath, and finally spinning the can axially and while partially submerged in a bath of tin.

7. The method of retinning cans, consisting of pickling the can in muriatic-acid, immersing in a flux bath, and finally spinning the can while partly submerged in a bath of tin and spraying the unsubmerged part of the can with a flux solution.

8. An apparatus for retinning cans, the same comprising a semicylindrical tank for containing the bath, the diameter of such tank being but slightly greater than the can to be tinned, and a rotatable shaft mounted concentrically with the tank and provided at its outer end with a rotating means and at its inner end with means for supporting a can axially with relation to the tank.

9. An apparatus for retinning cans, the same comprising a semicylindrical tank for containing the bath of tin, the diameter of such tank being but slightly greater than the can to be tinned, a rotatable shaft mounted concentrically with the tank and provided at its outer end with an operating crank, and angular can-engaging arms at the inner end of said shaft, said arms being perforated and threaded and provided with clamping-bolts for impinging upon the can and supporting the latter axially with relation to the shaft and tank.

10. In an apparatus for the purpose described, the combination with a suitable frame, and a semicylindrical tank supported therein, of a removable cover for the tank, a fume-uptake leading from the apparatus, a divided bearing-sleeve mounted in the frame and cover, a shaft journaled therein, provided at its outer end with an operating-crank and at its inner end with can-clamping means for supporting the can axially with relation to the tank and shaft, and means carried by the apparatus for discharging liquid flux solution upon the interior and exterior of the can when carried and rotated by the shaft.

11. In an apparatus for the purpose described, the combination with a suitable supporting-frame, and a semicylindrical tank supported therein, of a removable cover for the tank, a fume-uptake leading from the apparatus, a bearing-sleeve mounted in the frame, a shaft journaled therein and axially disposed with relation to the tank, said shaft having an operating-handle at its outer end, arms radiating from the inner end of the shaft and having can supporting means, a pipe depending through the cover to a point above the can when supported by the shaft, a laterally disposed perforated branch-pipe connected with said pipe, a sleeve located in one end of the cover, and a pipe perforated and slidably mounted in the sleeve and adapted to project within the can when the latter is in position and at a point above the contents of the tank.

12. An apparatus for the purpose described, comprising an elongated tank for containing the bath of tin, the dimensions of the tank exceeding those of the can to be retinned, a rotatable shaft journaled in the end wall and lengthwise of the tank, means located at the outer end of the shaft for rotating the same, and a can-carrying means carried by the shaft within the tank and adapted to support and rotate cans disposed in the same direction as the shaft.

13. An apparatus for the purpose described, comprising an elongated tank for containing the bath of tin, the dimensions of the tank exceeding those of the can to be retinned, a rotatable shaft journaled in the end wall and lengthwise of the tank, means for rotating the shaft, and a can support carried by the shaft within the tank whereby to support a can in the same direction as the shaft.

WALLACE V. CALLENDER.